US012288928B2

(12) United States Patent
Wu et al.

(10) Patent No.: US 12,288,928 B2
(45) Date of Patent: Apr. 29, 2025

(54) ELECTRONIC DEVICE

(71) Applicant: PEGATRON CORPORATION, Taipei (TW)

(72) Inventors: Chien-Yi Wu, Taipei (TW); Chao-Hsu Wu, Taipei (TW); Shih-Keng Huang, Taipei (TW); Hau Yuen Tan, Taipei (TW); Cheng-Hsiung Wu, Taipei (TW); Sheng-Chin Hsu, Taipei (TW); Tse-Hsuan Wang, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 169 days.

(21) Appl. No.: 18/355,285

(22) Filed: Jul. 19, 2023

(65) Prior Publication Data

US 2024/0047856 A1 Feb. 8, 2024

(30) Foreign Application Priority Data

Aug. 3, 2022 (TW) ................................ 111129146

(51) Int. Cl.
*H01Q 1/22* (2006.01)
*H01Q 9/04* (2006.01)

(52) U.S. Cl.
CPC ......... *H01Q 1/2291* (2013.01); *H01Q 9/0421* (2013.01); *H01Q 9/045* (2013.01)

(58) Field of Classification Search
CPC ..... H01Q 1/2291; H01Q 9/0421; H01Q 9/045
See application file for complete search history.

(56) References Cited

U.S. PATENT DOCUMENTS

| | | | | |
|---|---|---|---|---|
| 6,639,560 B1 * | 10/2003 | Kadambi | ............. H01Q 9/0442 343/702 |
| 11,189,929 B2 | 11/2021 | Ha et al. | |
| 2018/0351235 A1 | 12/2018 | Wang et al. | |

FOREIGN PATENT DOCUMENTS

| | | |
|---|---|---|
| CN | 104466390 | 3/2015 |
| CN | 107039766 | 8/2017 |
| CN | 109687148 | 4/2019 |
| CN | 114221127 | 3/2022 |
| TW | M580810 | 7/2019 |
| TW | M580811 | 7/2019 |
| TW | 202141851 | 11/2021 |

* cited by examiner

*Primary Examiner* — Henry Luong
(74) *Attorney, Agent, or Firm* — J.C. PATENTS

(57) ABSTRACT

An electronic device includes a metal back cover, a metal frame, and two radiators. The metal frame disposed at a side of the metal back cover includes two disconnecting parts, a second slot, and two connecting parts. A first slot is formed between each of the disconnecting parts and the metal back cover. The second slot is formed between the two disconnecting parts. The two connecting parts are connected to a side away from the second slot of the two disconnecting parts respectively and are connected to the metal back cover. Each of the radiators connects the metal back cover to the corresponding disconnecting part over the first slot. The two radiators are disposed symmetrically based on the second slot. Each radiator is coupled with the corresponding disconnecting part, the corresponding connecting part, and the metal back cover to resonate a first, a second, and a third frequency band.

13 Claims, 9 Drawing Sheets

ELECTRONIC DEVICE

CROSS-REFERENCE TO RELATED APPLICATION

This application claims the priority benefit of Taiwan application serial no. 111129146, filed on Aug. 3, 2022. The entirety of the above-mentioned patent application is hereby incorporated by reference herein and made a part of this specification.

BACKGROUND

Technical Field

The disclosure relates to an electronic device, and in particular to an electronic device which can resonate at multiple frequency bands.

Description of Related Art

In order to pursue a good appearance texture and light weight, casings of common electronic devices are mostly made of metal. However, how to dispose a broadband antenna on the electronic device having the metal casing to achieve a good operating efficiency is a goal that persons skilled in the art are devoted to research.

SUMMARY

The disclosure provides an electronic device which has a metal back cover and a frequency band resonated thereof has a good performance.

The electronic device of the disclosure includes a metal back cover, a metal frame, and two radiators. The metal frame is disposed at a side of the metal back cover and includes two disconnecting parts, a second slot, and two connecting parts, in which a first slot is formed between each of the disconnecting parts and the metal back cover, the second slot is formed between the two disconnecting parts, and the two connecting parts are connected to a side away from the second slot of the two disconnecting parts respectively and are connected to the metal back cover. Each of the radiators connects the metal back cover to the corresponding disconnecting part over the first slot, the two radiators are disposed symmetrically based on the second slot. Each of the radiators is coupled with the corresponding disconnecting part, the corresponding connecting part, and the metal back cover to resonate a first frequency band, a second frequency band, and a third frequency band.

Based on the above, the electronic device of the disclosure can resonate at multiple frequency bands simultaneously for signal transmission under the condition of maintaining the metal appearance and ensuring the isolation of the antenna by disposing multiple slots between the metal frame and the metal back cover.

DESCRIPTION OF THE EMBODIMENTS

Figure 1:
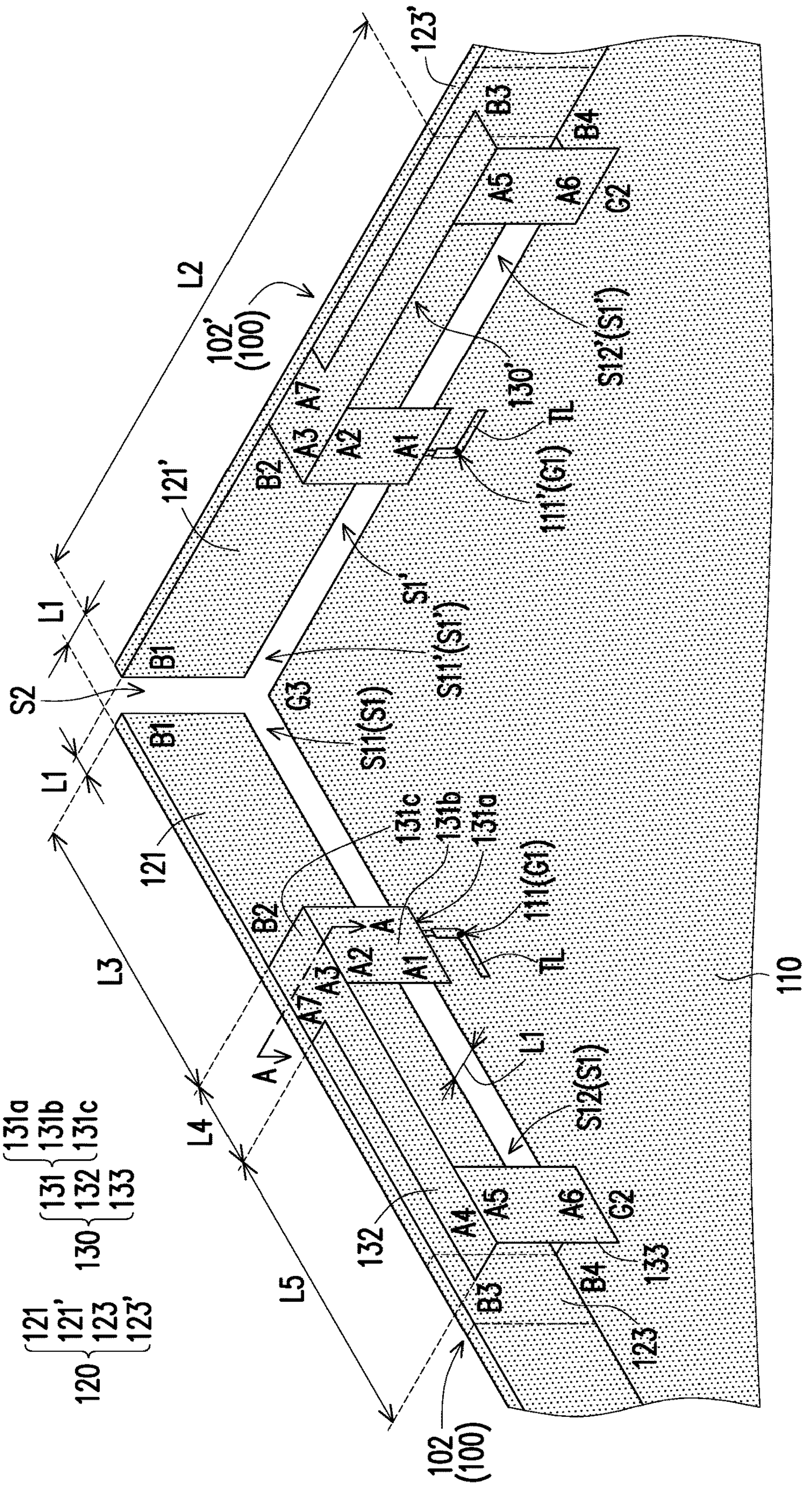
FIG. 1 is a partial schematic view of an electronic device according to the first embodiment of the disclosure.
Figure 2:
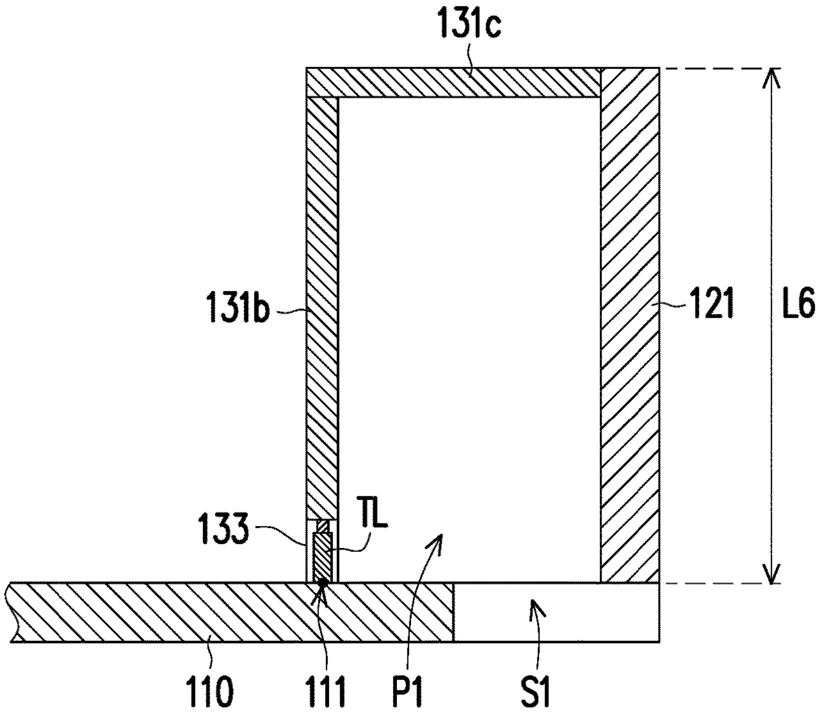
FIG. 2 is a schematic cross-sectional view of the electronic device in FIG. 1 along an A-A cross-section.

FIG. 1 is a partial schematic view of an electronic device according to the first embodiment of the disclosure. FIG. 2 is a schematic cross-sectional view of the electronic device in FIG. 1 along an A-A cross-section. Please refer to FIG. 1 and FIG. 2 at the same time. An electronic device 100 in this embodiment is, for example, a laptop computer or a tablet computer, but the types of the electronic device 100 are not limited thereto.

In this embodiment, the electronic device 100 includes a metal back cover 110 and a metal frame 120. The metal frame 120 is disposed at a side of the metal back cover 110 and includes two disconnecting parts 121, 121', a second slot S2, and two connecting parts 123, 123'. A first slot S1 is formed between each of the disconnecting parts 121, 121' and the metal back cover 110. The second slot S2 is formed between the two disconnecting parts 121, 121'. The two connecting parts 123, 123' are positioned at two sides of the two disconnecting parts 121, 121' and are connected to sides away from the second slot S2 of the two disconnecting parts 121, 121' respectively, and the two connecting parts 123, 123' are connected to the metal back cover 110. Two first slots S1, S1' are formed between the two disconnecting parts 121, 121' and the metal back cover 110. The second slot S2 is connected to a junction of the two first slots S1, S1'.

In detail, each of the first slots S1, S1' includes a first end 511 and a second end S12 opposite to each other. First ends S11, S11' of the respective first slots S1, S1' are connected to the second slot S2, and second ends S12, S12' of the respective first slots S1, S1' are adjacent to the corresponding connecting parts 123, 123'. As shown in FIG. 1, a width L1 of the first slots S1, S1' and the second slot S2 in this embodiment is, for example, 2 mm, and a length L2 of each of the first slots S1, S1' is, for example, 41 mm. In addition, the embodiment is positioned, for example, at a corner of the laptop computer or the tablet computer, and the two first slots S1, S1' and the second slot S2 jointly form a slot in a Y-shape.

In addition, the metal back cover 110 includes two ground ends 111, 111'. Each of the ground ends 111, 111' is positioned between portions adjacent to the second ends S12, S12' and portions adjacent to the first ends S11, S11' (that is, positioned at a position G1 in FIG. 1) of the corresponding first slots S1, S1' of the metal back cover 110. The respective ground ends 111, 111' are adjacent to a feeding end 131*a* of corresponding radiators 130, 130'.

It should be noted that the feeding end 131*a* is not directly connected to the metal back cover 110. In this embodiment, a coaxial transmission line TL and an LC matching circuit (not shown) are arranged between the ground end 111 and the corresponding feeding end 131*a*. A core wire (the positive end) of the coaxial transmission line TL is electrically connected to the feeding end 131*a* via the LC matching circuit, and a ground wire (the negative end) around the coaxial transmission line TL is electrically connected to the corresponding ground end 111. The radiator 130 is connected to an antenna circuit board (not shown) through the coaxial transmission line TL. In other embodiments of the disclosure, a component connecting the radiator 130 to the antenna circuit board may not be the coaxial transmission line TL, and the disclosure is not limited thereto.

The electronic device in this embodiment includes the two radiators 130, 130' (an area of a path from positions A1 to A7, from positions A3 to A4, and from positions A5 to A6) disposed symmetrically (mirror image) with each other on two sides of the second slot S2. The respective radiators 130, 130' are disposed above the metal back cover 110 and connect the corresponding disconnecting parts 121, 121' over the corresponding first slots S1, S1' from the metal back cover 110.

The respective radiators 130, 130' are coupled with the corresponding disconnecting parts 121, 121', the corresponding connecting parts 123, 123', and portions adjacent to the corresponding first slots S1, S1' of the metal back cover 110 to jointly form antenna structures 102, 102', and the antenna structures 102, 102' of this embodiment resonate at least a first frequency band, a second frequency band, and a third frequency band. The first frequency band is Wi-Fi 2.4 GHz, the second frequency band is Wi-Fi 5 GHz, and the third frequency band is Wi-Fi 6E. That is to say, the electronic device 100 of this embodiment is the dual antenna structures 102, 102', and each of the antenna structures 102, 102' can resonate at least frequency bands of Wi-Fi 2.4 GHz, Wi-Fi 5 GHz, and Wi-Fi 6E for signal transmission.

The following describes paths corresponding to the electronic device 100 coupling various frequency bands in this embodiment. Since the two radiators 130, 130' have the same pattern and are disposed in a mirror symmetry manner corresponding to the second slot S2, and the two ground ends 111, 111', the two disconnecting parts 121, 121', and the two connecting parts 123, 123' are also disposed symmetrical corresponding to the second slot S2, the subsequent description uses the radiator 130 and corresponding components on the left side in FIG. 1 for illustration.

Please refer to FIG. 1. The radiator 130 of this embodiment includes a first section 131 (the positions A1, A2, A3, and A7), a second section 132 (the positions A3 and A4), and a third section 133 (the positions A5 and A6) sequentially connected. The first section 131 includes the feeding end 131*a*, and the first section 131 is positioned above the metal back cover 110 and connected to the disconnecting part 121 (a position B2) over the first slot S1. A distance L3 separates between a junction where the first section 131 is connected with the disconnecting part 121 (the position A7) and the second slot S2. In this embodiment, the distance L3 is, for example, 17 mm.

The second section 132 extends in a direction away from the second slot S2 along an extending direction of the first slot S1. Two ends of the third section 133 (the positions A5 and A6) are connected to the second section 132 (the position A4) and the metal back cover 110 (a position G2) respectively. In this embodiment, lengths L4, L5, and L6 of the first section 131, the second section 132, and the third section 133 (as shown in FIG. 2) are, for example, 5 mm, 17 mm, and 7 mm, respectively.

In this embodiment, the disconnecting part 121, the connecting part 123 (an area of a path through positions B1 to B4), and a portion adjacent to the first slot S1 of the metal back cover 110 (an area of a path through the positions G2 and G1 to G3) form an antenna path in a C-shape, and jointly form a PIFA antenna with the first section 131 of the corresponding radiator 130 (an area of a path through the positions A1 to A3 and A7) and resonate at the first frequency band and the second frequency band. The first frequency band and the second frequency band are two resonance frequency bands of the Wi-Fi 2.4 GHz frequency band (2400 to 2500 MHz) and the double frequency Wi-Fi 5 GHz frequency band (5160 to 5600 MHz) respectively.

The first section 131 of the radiator 130 is coupled with the disconnecting part 121, the connecting part 123 (an area of a path through the positions B2 to B4), and a portion adjacent to the second end S12 of the corresponding first slot S1 of the metal back cover 110 extending to the corresponding ground end 111 (an area of a path through positions G2 to G1) to resonate at a first subsidiary frequency band and a third subsidiary frequency band of the third frequency band, in which the first subsidiary frequency band includes a range of 5600 to 6000 MHz, and the third subsidiary frequency band includes a range of 6700 to 7300 MHz.

In addition, a part of the first section 131, the second section 132, and the third section 133 of the radiator 130 (an area of a path of positions A1 to A6) are coupled with a junction of the metal back cover 110 connected with the third section 133 extending to the ground end 111 (an area of a path of positions G2 to G1) to resonate at a second subsidiary frequency band and the third subsidiary frequency band of the third frequency band, in which the second subsidiary frequency band includes a range of 6000 to 6700 MHz.

In this embodiment, the first section 131 includes a first sub-section 131*b* and a second sub-section 131*c*. The first sub-section 131*b* includes the feeding end 131*a*, and the second sub-section 131*c* is connected to the corresponding disconnecting part 121 over the corresponding first slot S1. The first sub-section 131*b* is configured to adjust or increase the impedance matching bandwidth of the third subsidiary frequency band. Specifically, by adjusting a width of the first sub-section 131*b* (i.e., adjusting a width of the path of the positions A1 and A2), the matching bandwidth of the third subsidiary frequency band may be adjusted or increased. In addition, adjusting a distance of a gap between the feeding end 131*a* and the ground end 111 (i.e., adjusting a distance between the positions A1 to G1) can also adjust the matching bandwidth of the third subsidiary frequency band. In this embodiment, a distance of a gap between a feeding end 131*a* and a ground end 111 is adjusted to be in a range of 0.5 mm to 1.5 mm.

Figure 3:
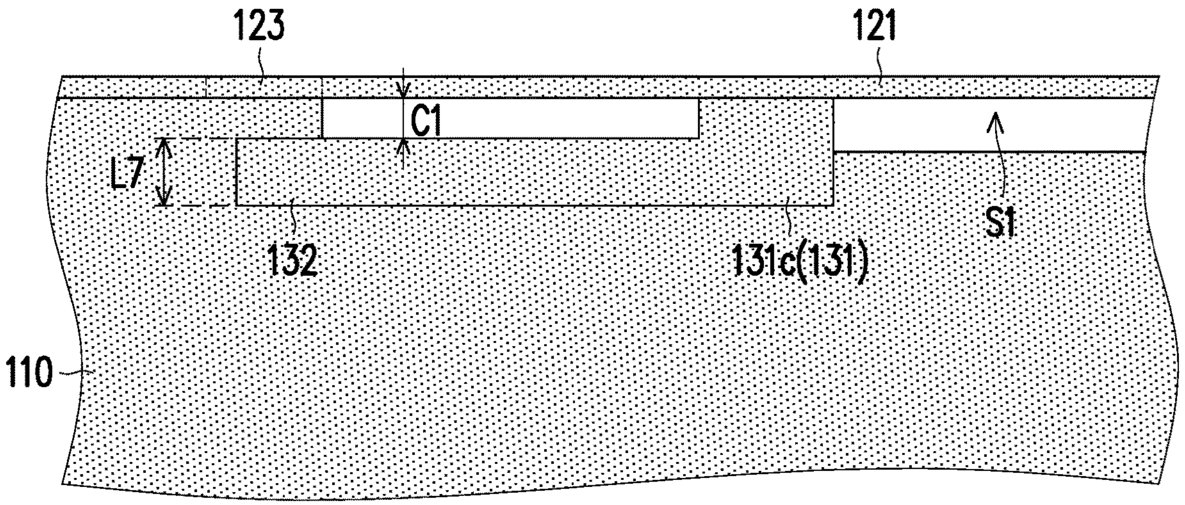
FIG. 3 is a partial top view of the electronic device in FIG. 1.

FIG. 3 is a partial top view of the electronic device in FIG. 1. Please refer to FIG. 3. A coupling spacing C1 is formed between the second section 132A and the corresponding disconnecting part 121. In this embodiment, a width of the coupling spacing C1 is 1.5 mm. Through disposing the coupling spacing C1, the impedance matching bandwidth of the Wi-Fi 6E resonance frequency band may be adjusted.

Based on the above, the electronic device 100 of this embodiment is the dual antenna structures 102, 102' disposed on two sides of the slot in the Y-shape and on the metal back cover 110, and the respective antenna structures 102, 102' may resonate at resonance frequency bands of Wi-Fi 2.4 GHz, Wi-Fi 5 GHz, and Wi-Fi 6E.

Figure 4:
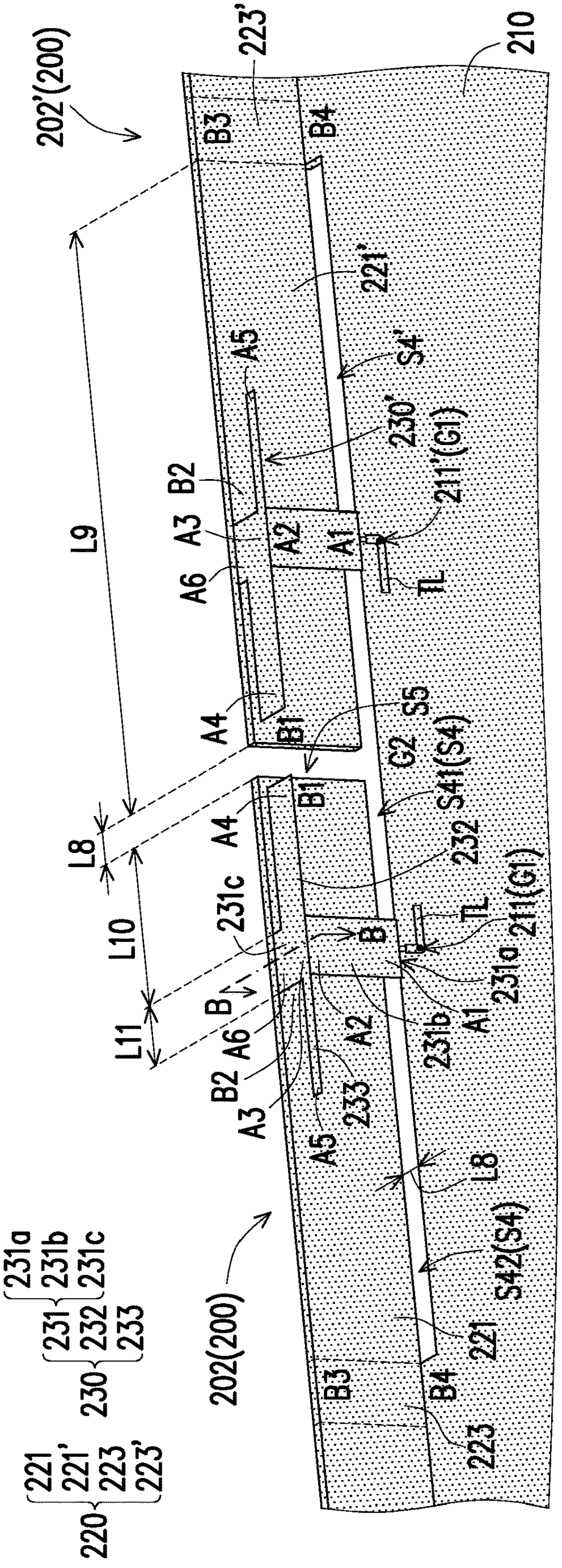
FIG. 4 is a partial schematic view of an electronic device according to the second embodiment of the disclosure.

FIG. 4 is a partial schematic view of an electronic device according to the second embodiment of the disclosure. FIG.

5 is a schematic cross-sectional view of the electronic device in FIG. 4 along a B-B cross-section. Please refer to FIG. 4 and FIG. 5 at the same time. An electronic device 200 in this embodiment is, for example, a laptop computer or a tablet computer, but the types of the electronic device 200 are not limited thereto.

In this embodiment, the electronic device 200 also includes a metal back cover 210, a metal frame 220, two radiators 230, 230', two first slots S4, S4', and a second slot S5. The metal frame 220 includes two disconnecting parts 221, 221' and two connecting parts 223, 223', and the metal back cover includes two ground ends 211, 211' symmetrical corresponding to the second slot S5.

Relative positions of the two first sections 230, 230', the two first slots S4, S4', the second slot S5, the metal back cover 210, the two disconnecting parts 221, 221', and the two connecting parts 223, 223' of the electronic device 200 in this embodiment are also disposed similar to the electronic device 100 in FIG. 1. In this embodiment, a width L8 of the first slots S4, S4' and the second slot S5 is, for example, 2 mm, and a length L9 of the first slot is, for example, 35 mm.

In addition, the respective radiators 230, 230' of the electronic device 200 in this embodiment are coupled with the corresponding disconnecting parts 221, 221', the connecting parts 223, 223', and portions adjacent to the corresponding first slots S4, S4' of the metal back cover 210 to jointly form antenna structures 202, 202', and the respective antenna structures 202, 202' in this embodiment may also resonate at least the first frequency band (Wi-Fi 2.4 GHz), the second frequency band (Wi-Fi 5 GHz), and the third frequency band (Wi-Fi 6E).

The difference between the electronic device 200 in this embodiment and the electronic device 100 in FIG. 1 is that the electronic device 200 is positioned, for example, on an edge of a surface of the laptop computer or the tablet computer, and the two first slots S4, S4' and the second slot S5 jointly form a slot with an appearance in a T-shape. In addition, patterns of the radiators 230, 230' are also different from patterns of the radiators 130, 130' in FIG. 1.

The following describes patterns of the radiators 230, 230' and paths corresponding to the antenna structures 202, 202' resonating at various frequency bands in this embodiment. Since the two radiators 230, 230' have the same patterns and are disposed symmetrical (minor image) based on the second slot S5, and the two ground ends 211, 211', the two disconnecting parts 221, 221', and the two connecting parts 223, 223' are also disposed symmetrical to the second slot S5, the subsequent description uses the radiator 230 and corresponding components on the left side in FIG. 4 for illustration.

Figure 5:
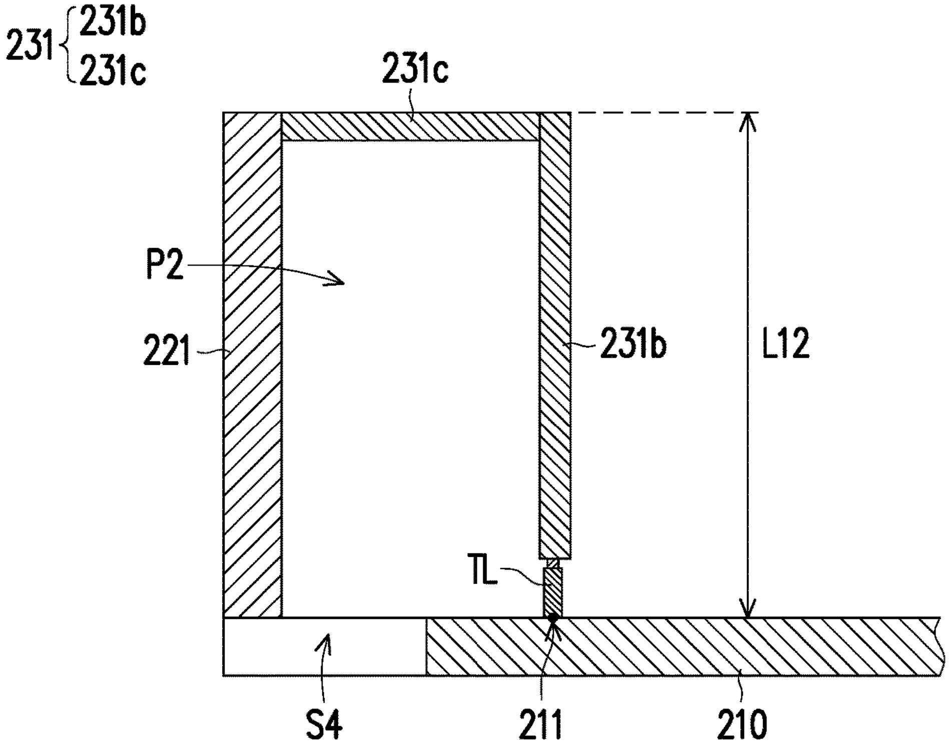
FIG. 5 is a schematic cross-sectional view of the electronic device in FIG. 4 along a B-B cross-section.

Please refer to FIG. 4 and FIG. 5. The radiator 230 of this embodiment includes a first section 231 (the position A1, A2, A3, and A6) and a second section 232 (the position A3 and A4) connected to the first section 231. The first section 231 includes a feeding end 231*a*, and the feeding end 231*a* is adjacent to the corresponding ground end 211 (the position G1). It should be noted that the feeding end 231*a* of this embodiment is not directly connected to the metal back cover 220, the configuration here is the same as the feeding end 131*a* in FIG. 1, and will not be repeated here.

The first section 231 is positioned above the metal back cover 210 and connected to the corresponding disconnecting part 221 (the position B2) over the corresponding first slot S4. The second section 232 extends toward the second slot S5 along an extending direction of the first slot S4. A distance L10 separates between a junction where the first section 231 is connected with the disconnecting part 221 (the position A6) and the second slot S5. In this embodiment, the distance L10 is, for example, 9.5 mm. In addition, a length L11 of the first section 231 in this embodiment is, for example, 3.5 mm, and a distance L12 of the first section 231 farthest from the metal back cover 210 (as shown in FIG. 5) is, for example, 7 mm.

In this embodiment, the disconnecting part 221, the connecting part 223 (from position B1 to position B4), and a portion adjacent to the first slot S4 (from position B4 to position G1 to position G2) form an antenna path in a C-shape, and jointly form a PIFA antenna with the first section 231 of the corresponding radiator 230 (from position A1 to position A3 to position A6) and resonate at the first frequency band and the second frequency band. The first frequency band and the second frequency band are Wi-Fi 2.4 GHz frequency band and Wi-Fi 5 GHz frequency band respectively.

In addition, the first section 231 and the second section 232 of the radiator 230 (from position A1 to position A4) are coupled with the corresponding disconnecting part 221, the connecting part 223 (from position A6 to position B2 to position B4), and a portion adjacent to the second end S42 of the corresponding first slot S4 of the metal back cover 210 extending to the corresponding ground end 211 (position G1) to resonate at a first ancillary frequency band and a third ancillary frequency band of the third frequency band, in which the first ancillary frequency band includes a range of 5600 to 6300 MHz, and the third ancillary frequency band includes a range of 6800 to 7300 MHz.

Figure 6:
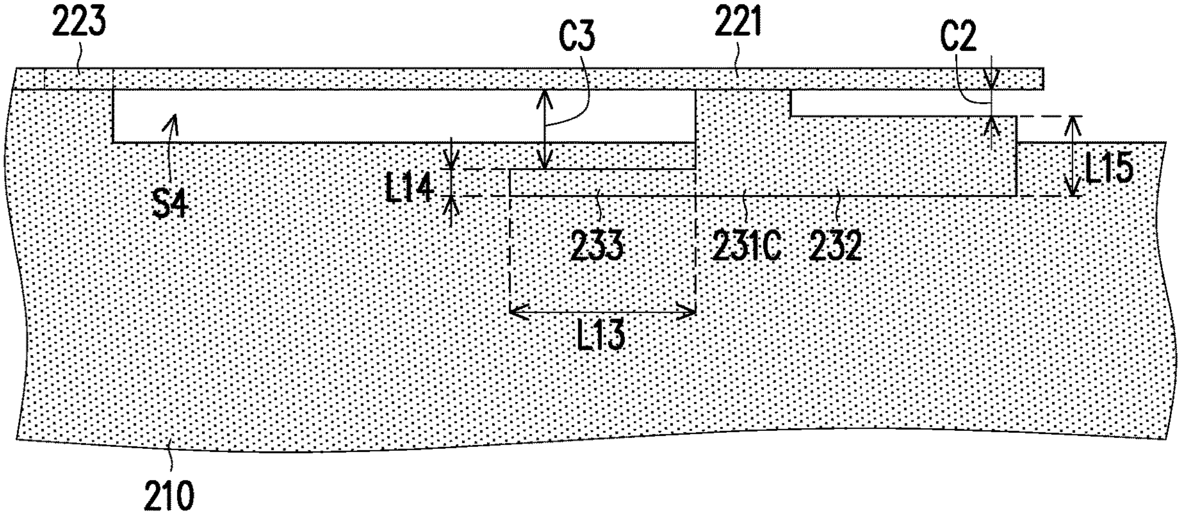
FIG. 6 is a partial top view of the electronic device in FIG. 4.

FIG. 6 is a partial top view of the electronic device in FIG. 4. Please refer to FIG. 6. T A first coupling spacing C2 is formed between the second section 232A and the corresponding disconnecting part 221. The first coupling spacing C2 is configured to adjust the impedance matching of the first ancillary frequency band of the third frequency band. In this embodiment, a width of the first coupling spacing C2 is, for example, 1 mm.

Please refer to FIG. 4 and FIG. 6 at the same time. The radiator 230 of this embodiment includes a third section 233 extending from the first section 231 in a direction away from the second slot S5 along the extending direction of the first slot S4. A length L13 and a width L14 of the third section 233 in this embodiment are, for example, 7 mm and 1 mm, respectively.

The first section 231 and the third section 233 of the radiator 230 (from position A1 to position A3 to position A5) are coupled with the corresponding disconnecting part 221, the connecting part 223 (from position A6 to position B2 to position B4), and the portion adjacent to the second end S42 of the corresponding first slot S4 of the metal back cover 210 extending to the corresponding ground end 211 (position G1) to resonate at a second ancillary frequency band and the third ancillary frequency band of the third frequency band, in which the second ancillary frequency band includes a range of 6300 to 6800 MHz.

In addition, a second coupling spacing C3 is formed between the third section 233 and the corresponding disconnecting part 221, and the second coupling spacing C3 is configured to adjust the impedance matching of the second ancillary frequency band of the third frequency band. In this embodiment, a distance of the second coupling spacing C3 is, for example, 3 mm, and is larger than a distance of the first coupling spacing C2.

Please refer to FIG. 4 and FIG. 5. The first section 231 of this embodiment includes a first sub-section 231*b* (from position A1 to position A2) and a second sub-section 231*c*

(from position A3 to position A4). The first sub-section 231*b* includes the feeding end 231*a* and is across the corresponding first slot S4. The second sub-section 231*c* is connected to the corresponding disconnecting part 221. Adjusting a width of a path of the first sub-section 231*b* is configured to adjust or increase the impedance matching bandwidth of the third ancillary frequency band. Specifically, by adjusting the width of the first sub-section 231*b* (i.e., adjusting the width of the path of the positions A1 and A2), the matching bandwidth of the third ancillary frequency band may be adjusted. In addition, adjusting a distance of a gap between the feeding end 231*a* and the ground end 211 (i.e., adjusting a distance between the positions A1 to G1) can also adjust the matching bandwidth of the third ancillary frequency band. In this embodiment, the distance of the gap between the feeding end 231*a* and the ground end 211 is adjusted to be in a range of 0.5 mm and 1.5 mm Based on the above, the electronic device 200 of this embodiment is the dual antenna structure 202, 202' disposed on two sides of the slot in the T-shape and on the metal back cover 210, and the antenna structures 202, 202' may respectively resonate at resonance frequency bands of Wi-Fi 2.4 GHz, Wi-Fi 5 GHz, and Wi-Fi 6E.

It is worth mentioning that, the coupling spacing C1, the first coupling spacing C2 of the electronic devices 100, 200 of the two embodiments plus the width of the second sections 132, 232 (that is, the width of the radiators 130, 230, which is also the width of the second sub-section 131*c*, 231*c*) are merely 4 mm respectively. When a screen is placed near the electronic devices 100, 200, the screen merely needs to be separated from the corresponding radiators 130, 230 by about 2 mm, and a metal retaining wall structure is disposed between the screen, and then the electronic devices 100, 200 can maintain the signal transmission capability. That is to say, the electronic devices 100, 200 of this disclosure not only have a metal appearance to improve the overall texture, but also have a narrow frame so that a large screen may be disposed, so that the full-screen visual requirement of a user can be met.

In addition, the electronic devices 100, 200 may be integrated with a cooling system through the corresponding two first slots S1, S1', S4, S4' and the second slots S2, S5, so as to dissipate the internal heat source of the electronic devices 100, 200.

Specifically, the two first slots S1, S1', S4, S4' and the second slots S2, S5 may be partially filled with plastic, so that the two first slots S5, S1', S4, S4' and the second slots S2, S5 have several holes connected to the outside world to dissipate heat directly or to be connected to a heat dissipation system, so as to improve the heat dissipation efficiency. Through such a design, the electronic devices 100, 200 of the disclosure have hidden cooling holes positioned between the metal back covers 110, 210 and the metal frames 120, 220, which not only is aesthetic in the appearance, but also improves the problem of heat dissipation being not easy due to the thinning of the electronic devices 100, 200.

Please refer to FIG. 1, FIG. 2, FIG. 4, and FIG. 5. There are spaces P1, P2 between the radiators 130, 230, the corresponding disconnecting parts 121, 221, and the metal back covers 110, 210. In practice, brackets (not shown) are disposed in the spaces P1, P2, and the radiators 130, 230 are attached to surfaces of the brackets. The two first slots S1, S1', S4, S4' and the second slots S2, S5 may optionally be filled with light-transmitting plastic or non-conductive materials, and LED light strips or light-emitting members (not shown) may be optionally disposed adjacent to the two first slots S1, S1', S4, S4' and the second slots S2, S5. This design allows light beams emitted from the LED light strips or the light-emitting members to pass through the first slots S1, S1', S4, S4' and the second slots S2, S5, so that the light beams are emitted around the electronic device, so as to improve an experience of the user when using the device. Certainly, the light-emitting members may also be optionally disposed between the radiators 130', 230' with respect to the corresponding disconnecting parts 121', 221' and the metal back covers 110, 210, and the disclosure is not limited thereto.

Figure 7:
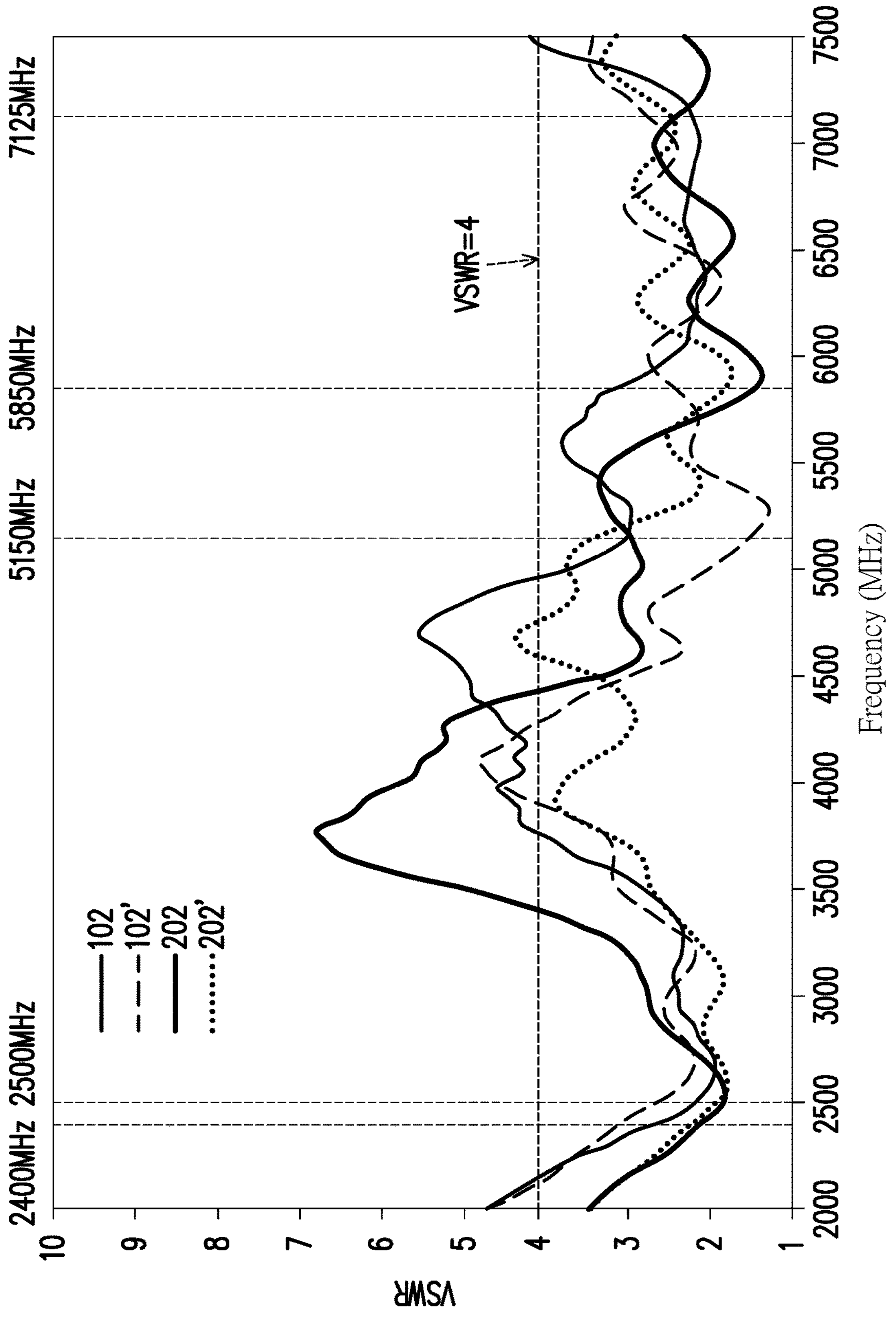
FIG. 7 is a frequency-VSWR relation view of antenna structures in FIG. 1 and antenna structures in FIG. 4.

FIG. 7 is a frequency-VSWR relation view of the antenna structures in FIG. 1 and the antenna structures in FIG. 4. Please refer to FIG. 7. The antenna structures 102, 102', 202, 202' in FIG. 1 and FIG. 4, within frequency bands of Wi-Fi 2.4 GHz (2400 to 2500 MHz), Wi-Fi 5 GHz (5150 to 5600 MHz), and Wi-Fi 6E (5600 to 7125 MHz), the VSWR is smaller than 4. That is to say, the antenna structures 102, 102' in FIG. 1 and the antenna structures 202, 202' in FIG. 4 have an effect of broadband and multiple frequency bands.

Figure 8:
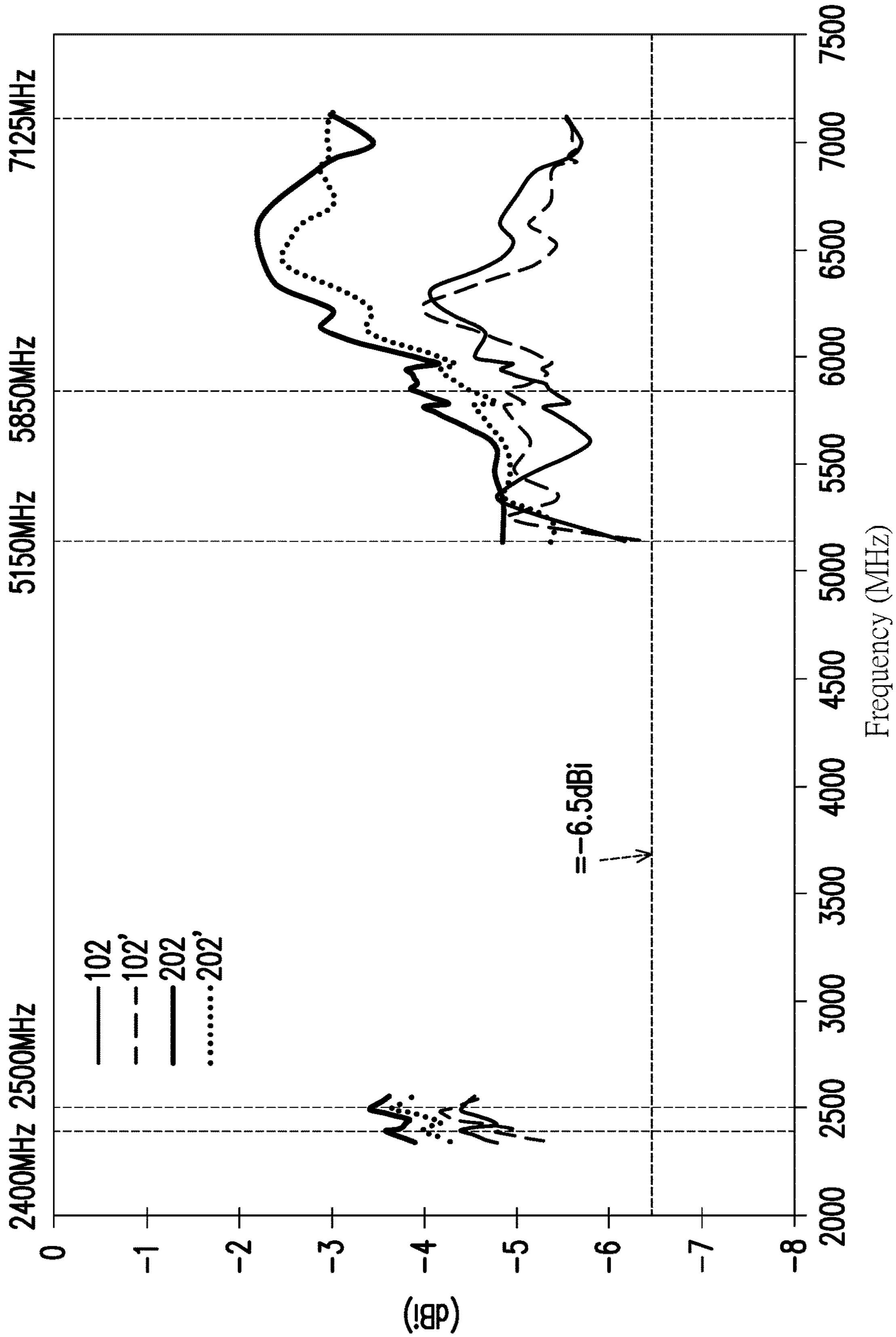
FIG. 8 is a frequency-antenna efficiency relation view of the antenna structures in FIG. 1 and the antenna structures in FIG. 4.

FIG. 8 is a frequency-antenna efficiency relation view of the antenna structure in FIG. 1 and the antenna structure in FIG. 4. Please refer to FIG. 8. Antenna efficiencies are respectively −4.2 to −5.3 dBi, −4.8 to −6.4 dBi, and −4.0 to −5.7 dBi of the antenna structures 102, 102' in FIG. 1 within frequency bands of Wi-Fi 2.4 GHz, Wi-Fi 5 GHz, and Wi-Fi 6E. Antenna efficiencies are respectively −3.4 to −4.3 dBi, −3.9 to −5.4 dBi, and −2.2 to −4.4 dBi of the antenna structures 202, 202' in FIG. 4 within frequency bands of Wi-Fi 2.4 GHz, Wi-Fi 5 GHz, and Wi-Fi 6E. That is to say, the antenna structures 102, 102' in FIG. 1 and the antenna structures 202, 202' in FIG. 4 all have good performances under Wi-Fi 2.4 GHz, Wi-Fi 5 GHz, and Wi-Fi 6E.

Figure 9:
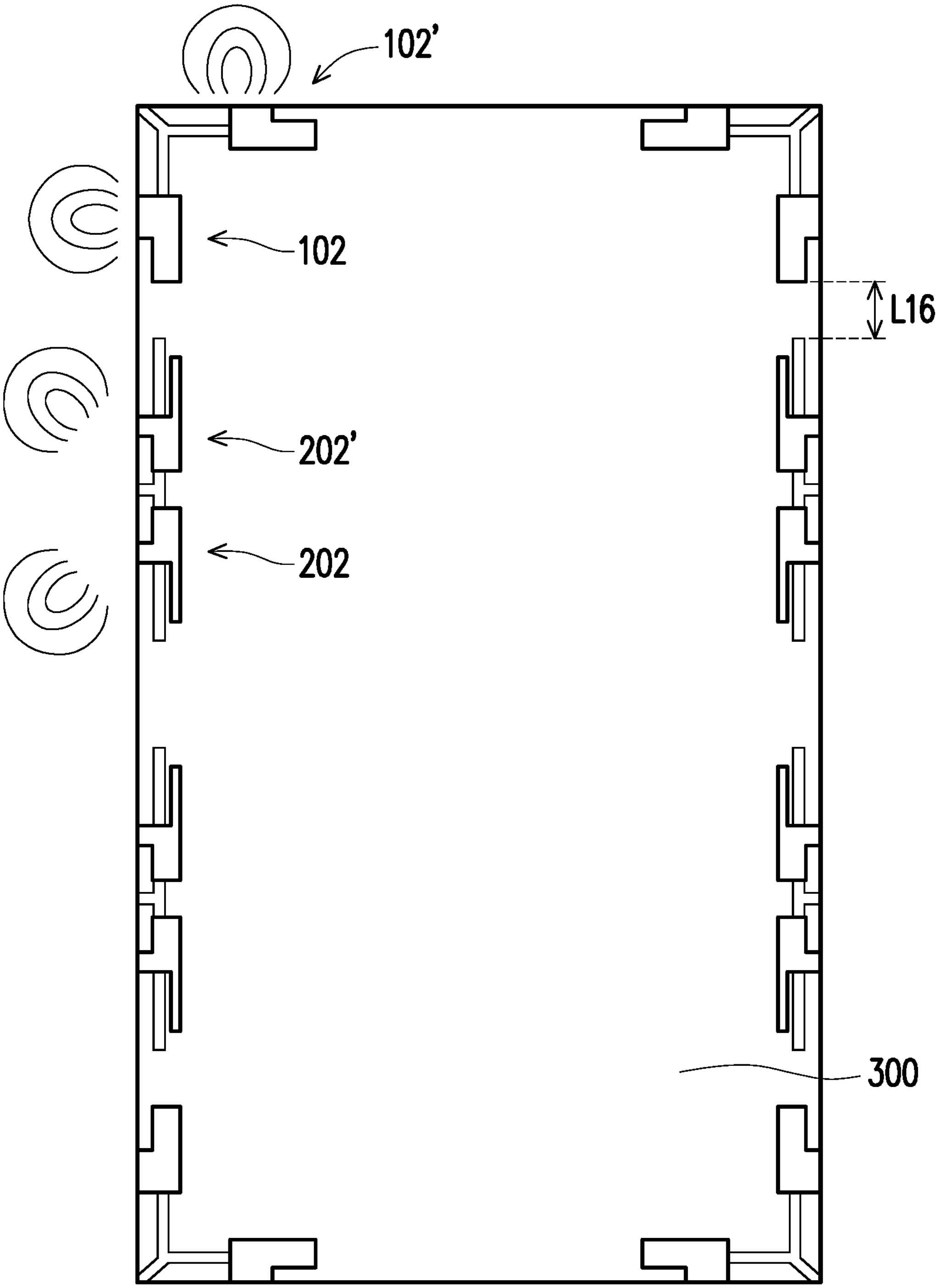
FIG. 9 is a schematic view of combining the antenna structures in FIG. 1 and the antenna structures in FIG. 4 into an electronic device.

FIG. 9 is a schematic view of combining the antenna structure in FIG. 1 and the antenna structure in FIG. 4 into an electronic device. It should be noted that various components shown in FIG. 9 merely schematically represent relative positions with respect to other components. Please refer to FIG. 1 to FIG. 6 for specific component structures.

Please refer to FIG. 9. Four sets of the antenna structures 102, 102' in FIG. 1 are disposed at the four corners of an electronic device 300, four sets of the antenna structures 202, 202' in FIG. 4 are disposed on the long sides of the electronic device 300, and a distance L16 between each of the antenna structures 102, 102', 202, 202' is at least, for example, 30 mm. Each of the four sets of the antenna structures 102, 102' and the four sets of the antenna structures 202, 202' may be optionally connected with a switch (not shown) and a single feed signal source (not shown). In each of the sets, merely one of the antenna structures is allowed to operate, so as to avoid interference between signals of the two antenna structures in each of the sets.

For example, the switch in the antenna structures 102, 102' in each of the sets may switch the single feed signal source to the antenna structure 102 or 102'. The switch in the antenna structures 202, 202' in each of the sets may switch the single feed signal source to the antenna structure 202' or 202', so that there is a certain spacing between the antenna structures when radiating signals. By switching the feed signal between the two antenna structures, the interference between signals of different antenna structures can be avoided, and the transmission capability of individual antenna structures for transmission or reception can be increased.

The electronic device 300 may be equipped with a gravity sensor (G-sensor, not shown) and a proximity sensor (P-sensor, not shown) at the same time, so as to further improve the transmission capability. For example, when the gravity sensor and the proximity sensor detect a human body or a metal object moving close to the antenna structure 102, the gravity sensor and the proximity sensor send out signals, so that the single feed signal source may be switched to the other antenna structure 102' to continue transceiving signals. This design can make the antenna structure continue to operate with another antenna structure when being covered by a human body or a metal object, so as to avoid the weakening of the transceiving signals, thereby improving the performance of wireless transmission.

In addition, the electronic device 300 may further be combined with the beam forming technology to gather energy radiated by each antenna structure, so as to avoid excessive divergence of the signal energy and increase the range and angle of the signal transmission of the device.

Figure 10:
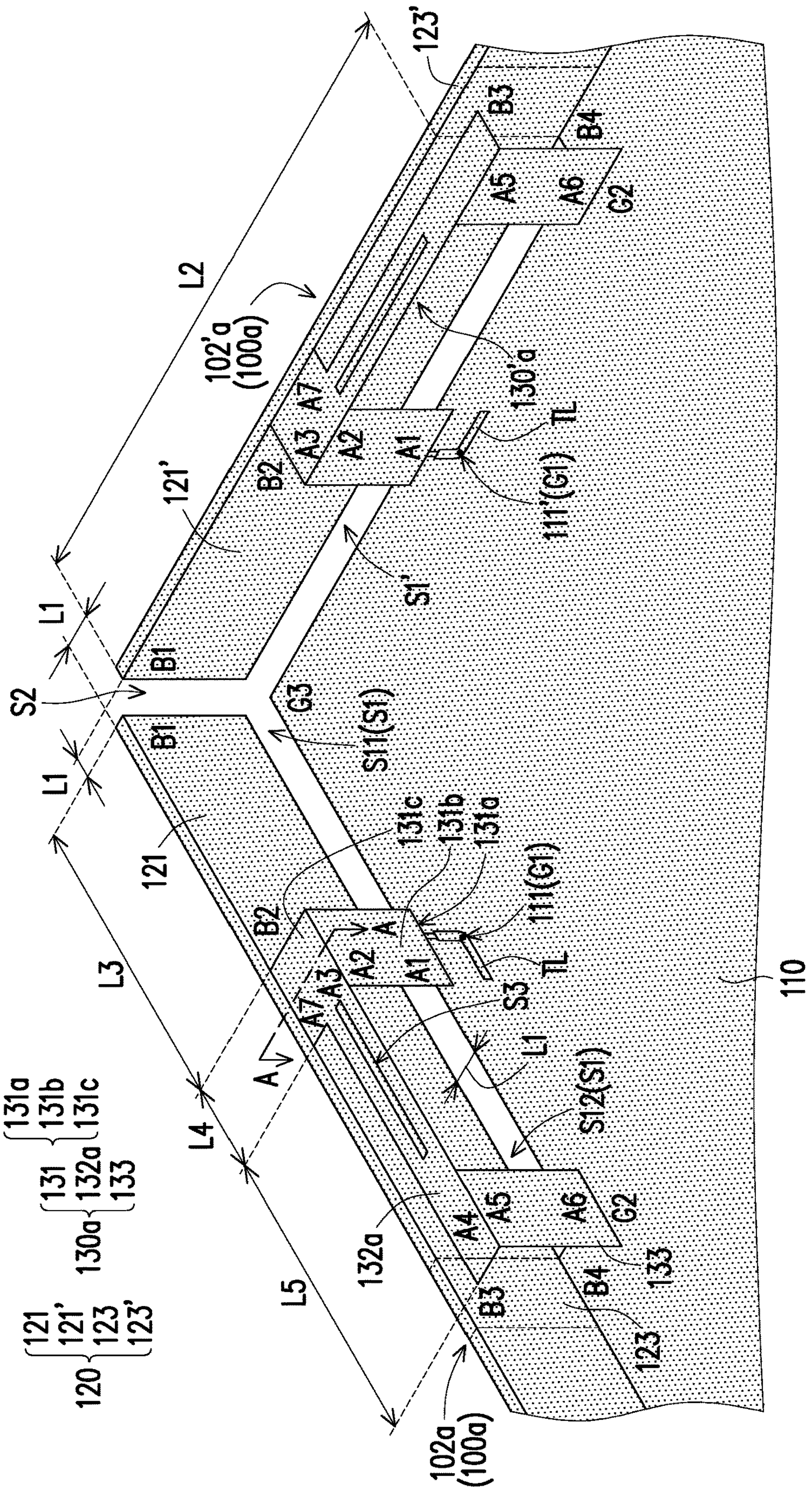
FIG. 10 is a partial schematic view of an electronic device according to the third embodiment of the disclosure.

FIG. 10 is a partial schematic view of an electronic device according to the third embodiment of the disclosure. An electronic device 100*a* of this embodiment is similar to the electronic device 100 of the first embodiment. The difference between the two is that a second section 132*a* of this embodiment includes a third slot S3 configured to resonate at a fourth frequency band. Specifically, a width of the second section 132*a* of this embodiment and a width L7 (as shown in FIG. 3) of the second end 132 of the first embodiment are, for example, both 2.5 mm. A width of the third slot S3 may be adjusted within a range smaller than this width to increase or optimize the impedance matching bandwidth of the fourth frequency band with a frequency range of 3300 to 5000 MHz. That is to say, antenna structures 102*a*, 102'a of this embodiment can respectively resonate at broadband frequency bands of Wi-Fi 2.4 GHz, Wi-Fi 6E, and 3300 to 5000 MHz.

Figure 11:
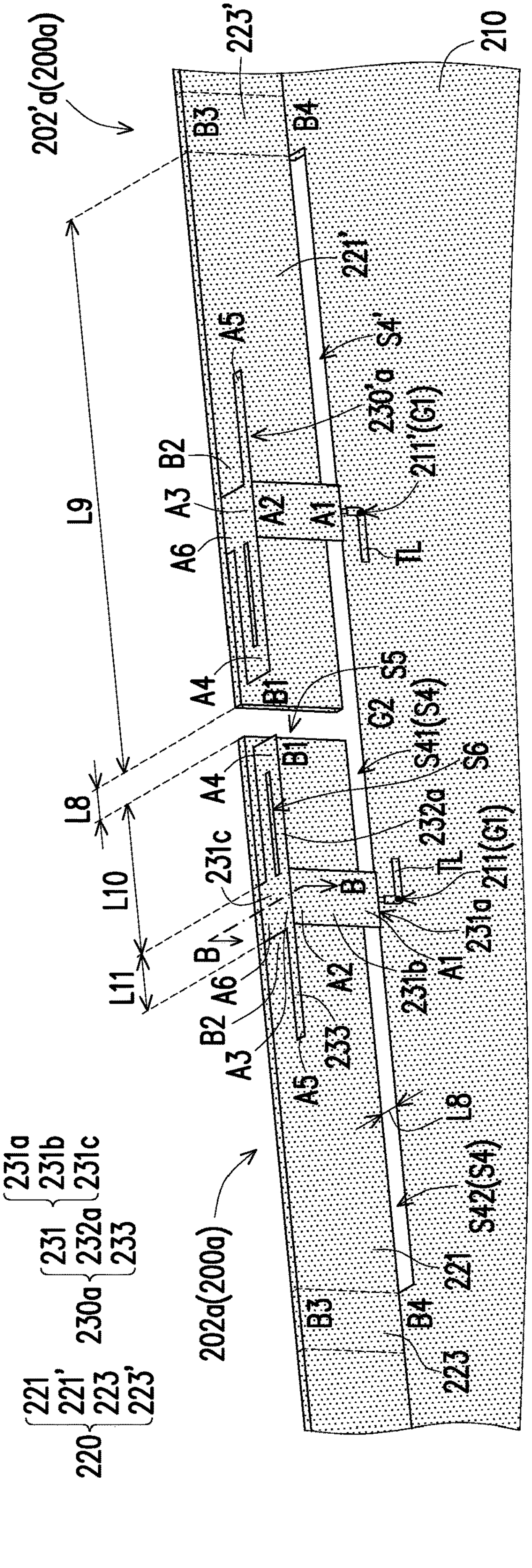
FIG. 11 is a partial schematic view of an electronic device according to the fourth embodiment of the disclosure.

FIG. 11 is a partial schematic view of an electronic device according to the fourth embodiment of the disclosure. An electronic device 200*a* of this embodiment is similar to the electronic device 200 of the second embodiment. The difference between the two is that a second section 232*a* of this embodiment includes a third slot S6 configured to resonate at a fourth frequency band. Specifically, a width of the second section 232*a* of this embodiment and a width L15 (as shown in FIG. 3) of the second end 232 of the second embodiment are, for example, both 3 mm. A width of the third slot S6 may be adjusted within a range smaller than this width to increase or optimize the impedance matching bandwidth of the fourth frequency band with a frequency range of 3300 to 5000 MHz. That is to say, antenna structures 202*a*, 202'a of this embodiment can respectively resonate at broadband frequency bands of Wi-Fi 2.4 GHz, Wi-Fi 6E, and 3300 to 5000 MHz.

In summary, the electronic device of the disclosure jointly forms the dual antenna structure through the two radiators coupled with the corresponding disconnecting parts, the corresponding connecting parts, and the portions adjacent to the corresponding first slots of the metal back cover. The radiator and the corresponding disconnecting part, connecting part, and the part of the metal back cover adjacent to the first slot resonate at different resonance frequency bands, which can cover the broadband frequency bands of Wi-Fi 2.4 GHz, Wi-Fi 5 GHz, and Wi-Fi 6E. Through disposing the first coupling spacing and the second coupling spacing between the radiator and the corresponding disconnecting part, the impedance matching of the resonance frequency band of Wi-Fi 6E can be adjusted. In some embodiments, through disposing the third slot, the impedance matching bandwidth with the frequency range of 3300 to 5000 MHz is increased or optimized. In addition, the dual antenna structures may be combined with the heat dissipation mechanism and the light-emitting elements to improve the effect of heat dissipation inside the electronic device and the experience when using the device. Furthermore, multiple dual antenna structures may be combined with the switch, the single feed signal source, the gravity sensor, and the proximity sensor at the same time to improve the performance of wireless transmission. Therefore, the electronic device of the disclosure has the dual antenna structure with broadband can perform signal transmission well under the condition of maintaining the metal appearance.

What is claimed is:

1. An electronic device, comprising:
- a metal back cover;
- a metal frame disposed at a side of the metal back cover, comprising:
  - two disconnecting parts, wherein a first slot is formed between each of the disconnecting parts and the metal back cover;
  - a second slot formed between the two disconnecting parts; and
  - two connecting parts connected to a side away from the second slot of the two disconnecting parts respectively and connected to the metal back cover; and
- two radiators, wherein each of the radiators connects the metal back cover to the corresponding disconnecting part over the first slot, the two radiators are disposed symmetrically based on the second slot, and each of the radiators is coupled with the corresponding disconnecting part, the corresponding connecting part, and the metal back cover to resonate a first frequency band, a second frequency band, and a third frequency band.

2. The electronic device as claimed in claim 1, wherein the first frequency band is Wi-Fi 2.4 GHz, the second frequency band is Wi-Fi 5 GHz, and the third frequency band is Wi-Fi 6E.

3. The electronic device as claimed in claim 1, wherein each of the radiators is coupled with the corresponding disconnecting part, the connecting part, and a portion adjacent to the corresponding first slot of the metal back cover to resonate the first frequency band and the second frequency band.

4. The electronic device as claimed in claim 1, wherein each of the first slots comprises a first end and a second end opposite to each other, the first end is connected to the second slot, the second end is adjacent to the corresponding connecting part, the metal back cover comprises two ground ends, each of the ground ends is positioned between a portion adjacent to the second end of the corresponding first slot of the metal back cover and a portion adjacent to the first end, and each of the radiators is coupled with the corresponding disconnecting part, the connecting part, and a portion adjacent to the second end of the corresponding first slot of the metal back cover extending to the ground end to resonate a first subsidiary frequency band and a third subsidiary frequency band of the third frequency band.

5. The electronic device as claimed in claim 4, wherein each of the radiators comprises a first section, a second section, and a third section sequentially connected, the first section comprises a feeding end, the first section connects the metal back cover to the corresponding disconnecting part over the corresponding first slot, the second section extends in a direction away from the second slot along an extending direction of the first slot and a coupling spacing is formed between the corresponding disconnecting part and the second section, and the third section is connected to the metal back cover.

6. The electronic device as claimed in claim 5, wherein each of the ground ends is adjacent to the corresponding feeding end, and a part of the first section, the second section, and the third section of each of the radiators are coupled with a junction of the metal back cover connected with the third section extending to the ground end to resonate a second subsidiary frequency band and the third subsidiary frequency band of the third frequency band.

7. The electronic device as claimed in claim 6, wherein the first section comprises a first sub-section and a second sub-section, the first sub-section comprises the feeding end, the second sub-section is connected to the corresponding disconnecting part over the corresponding first slot, the first sub-section is configured to increase an impedance matching bandwidth of the third subsidiary frequency band.

8. The electronic device as claimed in claim 5, wherein the second section comprises a third slot configured to resonate at a fourth frequency band.

9. The electronic device as claimed in claim 1, wherein each of the radiators comprises a first section and a second section connected to the first section, the first section comprises a feeding end, and the first section connects the metal back cover to the corresponding disconnecting part over the corresponding first slot, the second section extends toward the second slot along an extending direction of the first slot, the first section and the second section of each of the radiators are coupled with the corresponding disconnecting part, the connecting part, and a portion adjacent to the second end of the corresponding first slot of the metal back cover extending to the corresponding ground end to resonate a first ancillary frequency band and a third ancillary frequency band of the third frequency band, a first coupling spacing is formed between the second section and the corresponding disconnecting part, and the first coupling spacing is configured to adjust an impedance matching of the first ancillary frequency band of the third frequency band.

10. The electronic device as claimed in claim 9, wherein each of the radiators comprises a third section extending from the first section in a direction away from the second slot along the extending direction of the first slot, the first section and the third section of each of the radiators are coupled with the corresponding disconnecting part, the connecting part, and the portion adjacent to the second end of the corresponding first slot of the metal back cover extending to the corresponding ground end to resonate a second ancillary frequency band and the third ancillary frequency band of the third frequency band, a second coupling spacing is formed between the third section and the corresponding disconnecting part, and the second coupling spacing is configured to adjust an impedance matching of the second ancillary frequency band of the third frequency band.

11. The electronic device as claimed in claim 10, wherein the second coupling spacing is larger than the first coupling spacing.

12. The electronic device as claimed in claim 10, wherein the first section comprises a first sub-section and a second sub-section, the first sub-section comprises the feeding end and is across the corresponding first slot, the second sub-section is connected to the corresponding disconnecting part, and the first sub-section is configured to increase an impedance matching bandwidth of the third ancillary frequency band.

13. The electronic device as claimed in claim 9, wherein the second section comprises a third slot configured to resonate at a fourth frequency band.

* * * * *